UNITED STATES PATENT OFFICE.

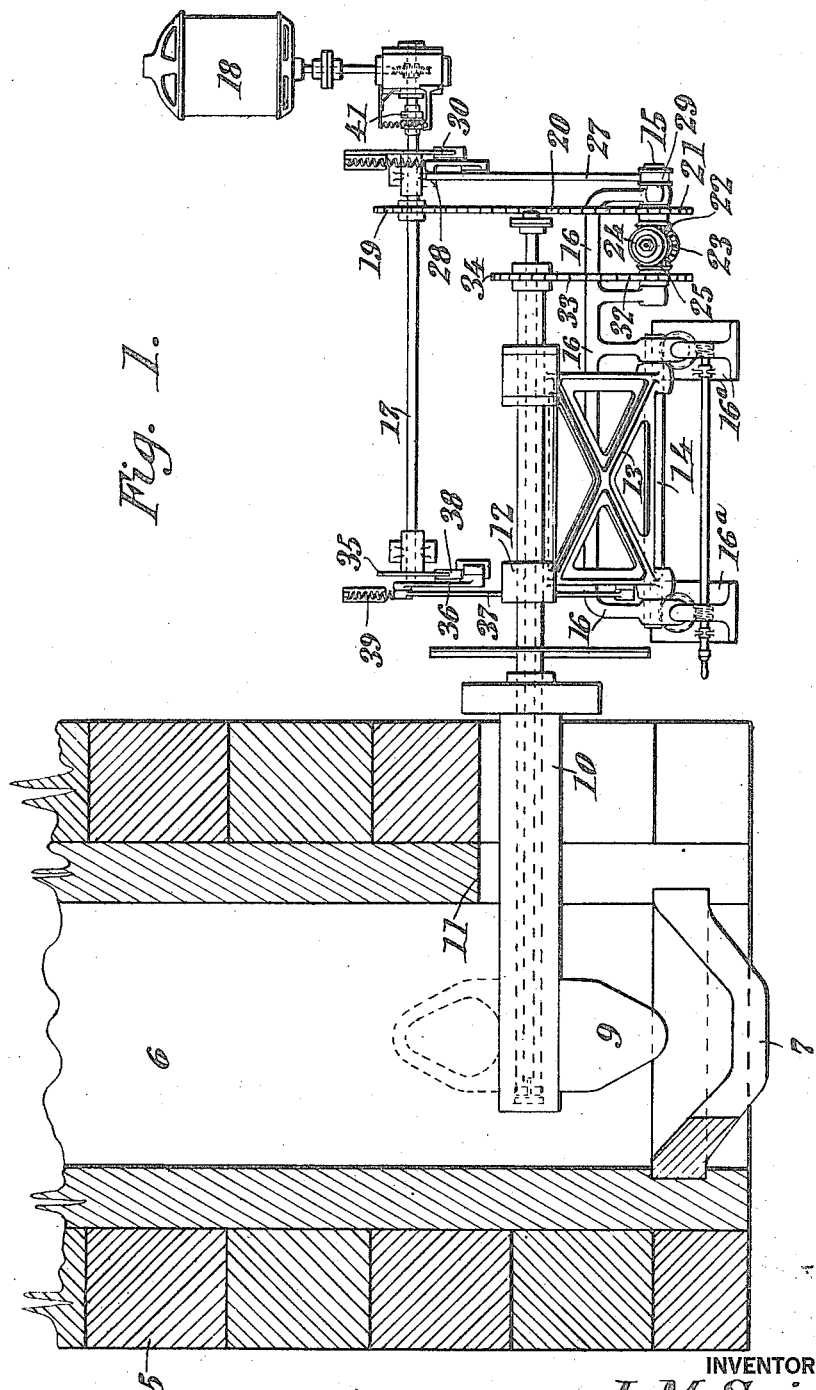

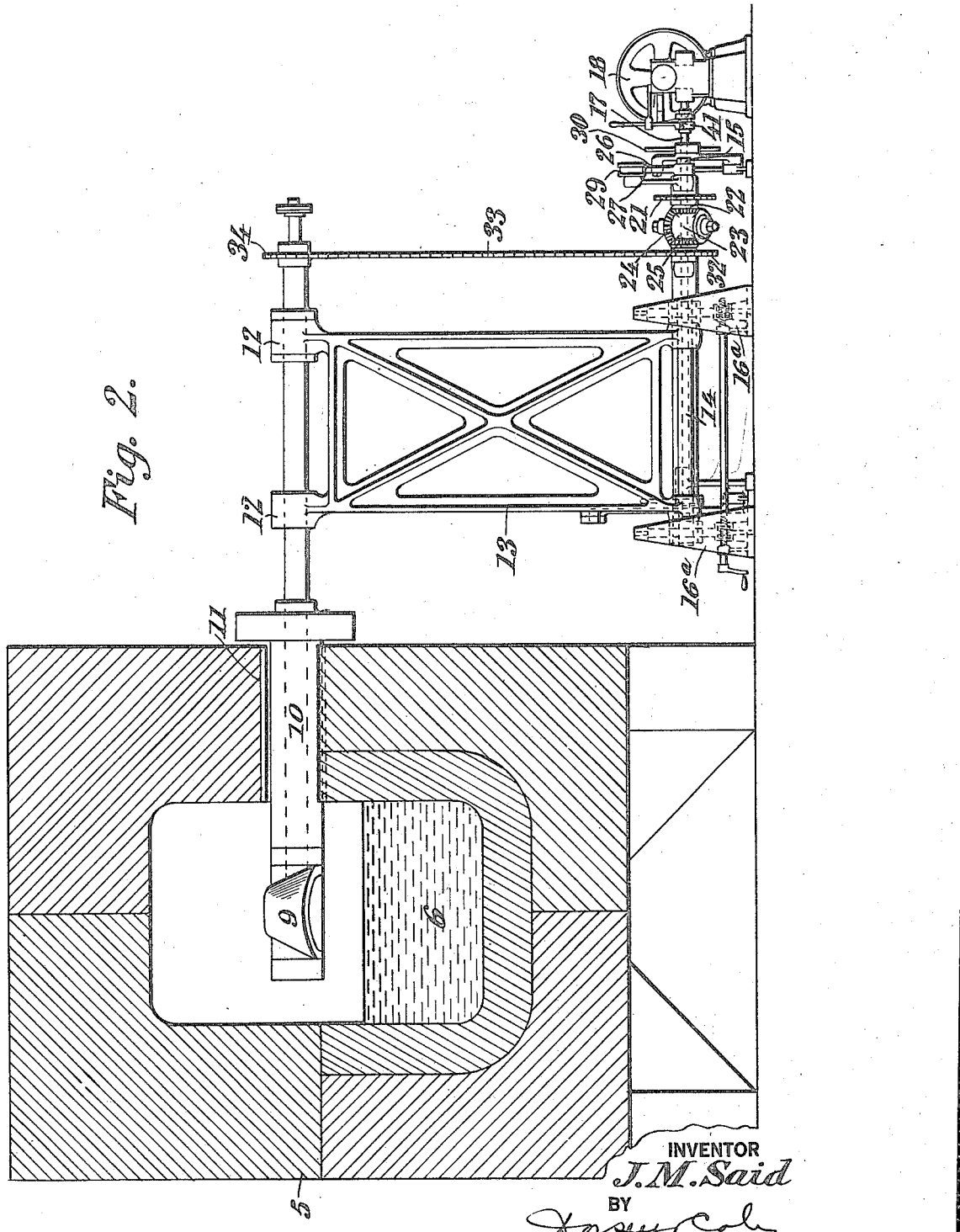

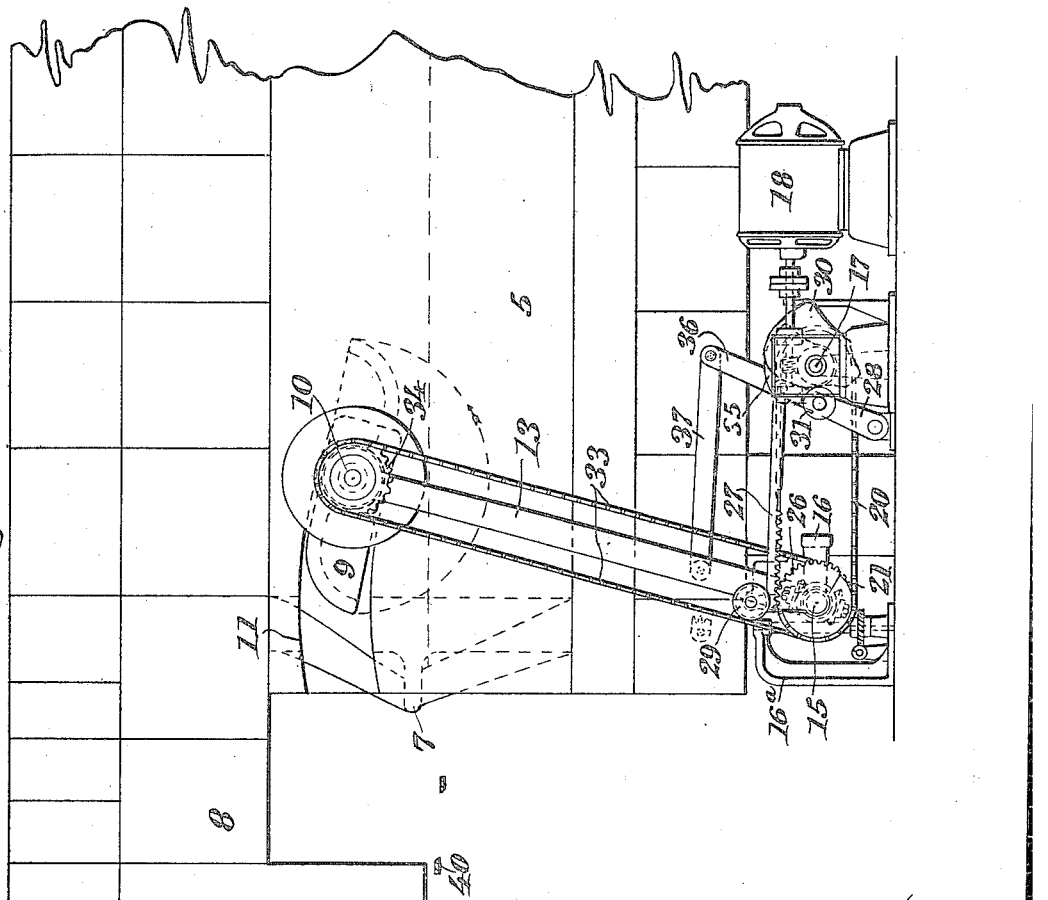

JESSE M. SAID, OF CORNING, NEW YORK, ASSIGNOR TO CORNING GLASS WORKS, OF CORNING, NEW YORK, A CORPORATION OF NEW YORK.

OBTAINING GLASS.

1,424,184. Specification of Letters Patent. Patented Aug. 1, 1922.

Application filed February 9, 1921. Serial No. 443,663.

*To all whom it may concern:*

Be it known that I, JESSE M. SAID, a citizen of the United States of America, and a resident of Corning, New York, have invented certain new and useful Improvements in Obtaining Glass, of which the following is a specification.

This invention relates to improvements in apparatus for delivering molten glass, and it is particularly adapted for use in connection with glass furnaces where it is desired to withdraw regulated quantities of molten glass from the furnace at suitable intervals.

Heretofore in automatically delivering molten glass from pots or furnaces, it has usually been the custom to discharge the glass into receptacles such as molds or the like, either through an opening in the bottom of the furnace, or by means of an intermittently oscillated paddle that would discharge the glass over a lip formed in a forehearth attached to the working end of the furnace.

In the present case, charges or gobs of molten glass are scooped up from a gathering pool, and then carried outwardly beyond the edge of the pool, where the ladle is inverted to permit the molten glass to fall into a suitable receptacle, such as a mold. The pool of molten glass is formed in the working or gathering end of a glass melting furnace, and this pool is enclosed by a hood formed from refractory material so as to enable a high temperature to be maintained for the purpose of retaining the glass in substantially the same condition as the glass in the furnace.

In reducing this invention to practice, I have provided means for actuating the ladle so that it is capable of being operated continuously or intermittently. There is also provided means for maintaining the several parts at the desired heighth with respect to the glass level.

In the accompanying drawings wherein there is illustrated the preferred embodiment of my invention:—

Figure 1, is a horizontal section through a forehearth of a glass furnace, showing in plan the installation of my improved apparatus thereto;

Fig. 2, is a front view of the apparatus shown in Fig. 1, the forehearth being shown in section;

Fig. 3, is a side elevation, and

Fig. 4, is a longitudinal section through the forehearth showing the ladle in discharging position.

Referring to the drawings, a forehearth 5, formed from blocks of suitable refractory material, and having a bottom, sides, a top, and an end, is built onto the working end of a glass melting furnace (not shown) so that a reservoir 6, is provided, for maintaining a pool of molten glass. The outer end 7 of the forehearth, is of a heighth sufficient to prevent the glass from spilling out of the forehearth when the glass is at its highest level. The forehearth is covered by a hood 8, the front wall of which extends beyond the front wall of the forehearth; the hood being designed to retain the heat from auxiliary burners (not shown) that project flames into the forehearth for the purpose of maintaining the glass therein at the desired working temperature.

Charges from the pool of molten glass in the reservoir 6, are adapted to be delivered to a receptacle such as a mold or the like (not shown) positioned in front of the front wall of the forehearth, and below the upper edge thereof, by a ladle 9, made of suitable refractory material. This ladle is eccentrically mounted on the inner end of a hollow shaft 10, for transitory movement from a selected point above the forehearth, to a point beyond its front wall 7, a slot 11 being formed in one side between the forehearth and the hood for the purpose of permitting the necessary movements of the shaft for this purpose. The shaft 10 is made hollow to permit the introduction therein of a fluid, whereby its end that projects over the forehearth may be cooled.

The shaft 10 extends beyond the side wall of the forehearth, and it is there supported by bearings 12 formed on the upper edge of a rectangular frame 13. The frame 13 has its lower edge pivotally mounted on a rod 14 that is carried by a frame 16. The frame 13 is adapted to be swung forward and backward during the operation of the device by suitable mechanism, to be hereinafter fully described.

The frame 16, in which is pivoted the frame 13, is adjustably mounted in a pair of spaced brackets 16ª, for the purpose of enabling frame 13 to be raised and lowered, whereby the relative position of the ladle 9 to the level of the glass within the forehearth can be controlled.

The actuating mechanism for the frame 13 and ladle 9 is located to the rear of the frame 16. The mechanism for revolving the ladle 9 is carried on a shaft 15 in line with the pivot 14 of the frame 13, while the mechanism for swinging the frame 13 includes a main drive shaft 17. Shaft 17 has keyed thereon a sprocket 19, which through a chain 20, transmits motion to a sprocket 21 sleeved on shaft 15, with no change in speed.

The sprocket 21 is fast with a gear 22 of a differential gearing 23, so that they float on shaft 15. Pinions 24, of the differential gearing 23 are mounted in a yoke, which is keyed to the shaft 15, and mesh with gears 22 and 25. This gearing is designed so that the speed ratio between gears 22 and 25 is, one to one, so long as the center of the pinions 24 remain unchanged.

A sector gear 26, is fast on the outer end of shaft 15. This sector meshes with a rack bar 27 that has one end connected to an arm 28 which is moved forward and backward by means of a cam 30 keyed on shaft 17, a roller 31 swiveled to the arm 28 engaging the cam. The rack bar 27 is backed by a grooved roller 29 for the purpose of keeping it in mesh with the sector gear 26.

As the shaft 17 revolves, the cam 30 thereon moves the arm 28 and the rack 27 forward and backward, thereby causing an angular motion to be imparted to the sector gear 26, and in this manner the shaft 15 and the yoke of the differential gearing are rocked forward and back. It is evident that the resulting movement of the gear 25 of the differential gearing is the resultant of the rotation of the gear 22 and the angular motion of the sector gear 26. It is, therefore, possible to add to, or subtract from the motion of the gear 22 a reasonable amount of angular motion, so as to give the gear 25 the desired angular motion or dwell.

The gear 25, of the differential gearing, is fastened rigidly to a sprocket 32, that is connected, by means of a chain 33, to a sprocket 34, on the outer end of the shaft 10, carrying the ladle 9. In this manner, the motion of the ladle 9 around its axis is the same as that of the gear 25, since the sprockets 32, and 34, and the chain 33, constitute a parallelogram of motion. The swinging movements of the frame 13, will therefore, not effect the rotation of the shaft 10.

The first movement at the beginning of one cycle of operation, with the parts shown in the position illustrated by Fig. 3, is the movement of the ladle 9 through an arc of about 180° to the position indicated by the dotted lines. This movement carries the ladle through the pool of glass, and in this manner a gather of glass is obtained. When the ladle reaches the position shown by the dotted lines, Fig. 3, the frame 13 swings forwardly on its pivot until the center of the shaft 10 is beyond the outer edge of the lip 7, (without substantially turning movement of the ladle in space), when the shaft 10 is revolved through an arc of about 180° to invert the ladle, thereby permitting the glass to fall therefrom.

The frame 13 is designed to be swung forward and then backward, during the cycle of operation, and it is given the desired motions from a cam 35 keyed on shaft 17. An arm 36, having its lower end pivotally connected to the base of the apparatus, and its upper end connected to one end of a link 37, carries a roller 38 that engages with the cam 35. The link 37 has its opposite end pivotally connected to the frame 13. The roller 38 of the arm 36 is retained in engagement with the cam 35 by means of a contractile spring 39, and as the shaft 17 revolves, the cam swings the arm 36 forwardly under the tension of the spring 39, thereby swinging the frame 13 forwardly. The design of the cam is such that, during one revolution of the shaft 17, the frame 13 will, at the end of its outward movement, remain stationary while the ladle is being inverted and then, after the desired interval, be swung rearwardly to the position illustrated by Fig. 3. Thus in one revolution of the shaft 17, the frame 13 is swung forwardly the desired distance and held stationary for a length of time sufficient to permit the glass within the ladle to be discharged therefrom, and then swung backwardly to its rearward position. This motion is obtained by constructing the cam 35 with two concentric runs of different radii, one of which (the lesser) permits the frame 13 to remain in its rearward position, while the other permits the frame to remain in its outer position, the difference between the two radii determining the distance the ladle is swung. The two concentric runs of the cam 35 are connected in such manner that when the roller 38 of the arm 36 rides thereon, the frame will be moved either outward or inward at uniform speed.

The cam 30 is so designed that it actuates the mechanism for revolving the ladle 9, when the frame 13 is idle. However, when the frame is being swung from its inward to its outward position, and vice versa, the ladle is maintained by the differential gearing described in such position that the glass contained therein will not be spilt.

When the ladle is in its discharging position, as shown by Fig. 4, and the molten glass is falling therefrom in the form of a gob, suitable means can be used for severing this gob, and in the present case I have shown shears 40 for this purpose. These shears may be actuated in any approved manner.

The drive shaft 17 is connected to a motor 18 through suitable reduction gearing. A clutch 41, that is mounted on the end of the shaft 17, nearest the motor for the purpose of enabling the motor to be kept running while the balance of the apparatus is stationary, is adapted to be engaged and disengaged in any desired manner. The parts are designed so that one revolution of the shaft 17 makes one cycle of movement of the delivering mechanism. Should it be so desired, these cycles can be continuous by keeping the clutch 41 engaged, or, the clutch can be disengaged at the end of each cycle to cause an interval between the cycles.

The devices for automatically delivering charges of molten glass, heretofore used have usually been designed to operate at considerable speed, for instance, at a speed of 20 or more times per minute. My device, although capable of being operated at fairly high speed, is particularly designed for slow work, or at a speed of not exceeding 10 times per minute.

It is to be understood that the size of the ladle the amount of swing partaken of by frame 13, and the design of the actuating mechanisms, can be modified as desired without departing from the spirit of the appended claims.

Having thus described my invention what I claim and desire to secure by Letters Patent is:—

1. In apparatus for delivering molten glass, the combination of a ladle mounted on a horizontal axis over a pool of glass, means for imparting movement to said ladle on its axis to cause it to enter the glass and obtain a quantity thereof, means for swinging the axis of the ladle to cause the ladle to clear the pool, means for inverting the ladle so as to discharge a quantity of glass therefrom, and means for returning the ladle to its position over the pool.

2. In apparatus for delivering molten glass the combination of a ladle having an open top mounted over a pool of glass said ladle being adapted to be revolved around an axis parallel to the surface of the pool, and to its top and means for swinging the ladle clear of the pool and discharging the glass therefrom.

3. The method of delivering glass which comprises obtaining a charge of glass by means of swinging a ladle mounted over a pool of molten glass, through the glass imparting a transitory movement to said ladle to remove it from over the pool, then inverting the ladle to permit the glass to fall therefrom, and then returning the ladle to its position over the pool of glass.

JESSE M. SAID.